US012679700B2

(12) United States Patent
Wang et al.

(10) Patent No.: US 12,679,700 B2
(45) Date of Patent: Jul. 14, 2026

(54) PASSENGER CONVEYOR SYSTEM AND ANTI-COLLISION DEVICE FOR STEP AND COMB PLATE

(71) Applicant: Otis Elevator Company, Farmington, CT (US)

(72) Inventors: Baoyu Wang, Haining (CN); Kaisheng Xu, Haining (CN); De Wu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 166 days.

(21) Appl. No.: 18/792,684

(22) Filed: Aug. 2, 2024

(65) Prior Publication Data

US 2025/0051142 A1 Feb. 13, 2025

(30) Foreign Application Priority Data

Aug. 10, 2023 (CN) ........................ 202311007070.5

(51) Int. Cl.
*B66B 29/06* (2006.01)
*B66B 21/04* (2006.01)
*B66B 23/00* (2006.01)
*B66B 25/00* (2006.01)

(52) U.S. Cl.
CPC ............. *B66B 29/06* (2013.01); *B66B 21/04* (2013.01); *B66B 25/00* (2013.01)

(58) Field of Classification Search
None
See application file for complete search history.

(56) References Cited

FOREIGN PATENT DOCUMENTS

| | | | | | |
|---|---|---|---|---|---|
| CN | 109502467 | A | * 3/2019 | | B66B 29/06 |
| CN | 109502468 | A | * 3/2019 | | B66B 29/06 |
| CN | 109516359 | A | * 3/2019 | | B66B 29/06 |
| CN | 109573803 | A | * 4/2019 | | B66B 29/06 |
| CN | 214326869 | U | * 10/2021 | | |
| CN | 214652929 | U | * 11/2021 | | |
| WO | WO-2019142308 | A1 | * 7/2019 | | B66B 29/06 |
| WO | WO-2020230299 | A1 | * 11/2020 | | B66B 29/06 |

* cited by examiner

*Primary Examiner* — Gene O Crawford
*Assistant Examiner* — Muhammad Awais
(74) *Attorney, Agent, or Firm* — CANTOR COLBURN LLP

(57) ABSTRACT

A passenger conveyor system and an anti-collision device for step and comb plate. The passenger conveyor system includes a step chain having a plurality of steps, a comb plate and an anti-collision device, the anti-collision device includes an actuating mechanism connected to the comb plate and configured to, when a moving distance of a step adjacent to comb teeth of the comb plate to be engaged in a vertical upward direction of the passenger conveyor system exceeds a preset value, actuate the comb plate to be lifted up from an initial first position to a second position to avoid collision with the step; and a reset mechanism configured to return the comb plate from the second position to the first position after the step travels through the comb plate.

14 Claims, 6 Drawing Sheets

PASSENGER CONVEYOR SYSTEM AND ANTI-COLLISION DEVICE FOR STEP AND COMB PLATE

FOREIGN PRIORITY

This application claims priority to Chinese Patent Application No. 202311007070.5, filed Aug. 10, 2023, and all the benefits accruing therefrom under 35 U.S.C. § 119, the contents of which in its entirety are herein incorporated by reference.

TECHNICAL FIELD OF INVENTION

The present disclosure relates to a conveying system, in particular to a passenger conveyor system and an anti-collision device for step and comb plate.

BACKGROUND OF THE INVENTION

At present, various passenger conveyor systems such as escalators and moving walks have been widely used in many places, which bring great convenience to people's work, production, and travel. Nevertheless, the present application finds that improvements can still be made in certain aspects of the existing passenger conveyor products. For example, during the operation of the existing passenger conveyor systems, in some cases, the steps may collide with the comb teeth of the comb plate during travel. For example, as some small objects carried by passengers (such as keys, small stones, makeup pens, etc.) accidentally fall into the guide rails on which the steps are running and are clamped, the steps will be lifted up and cannot travel along the preset normal trajectory and then engage with the comb teeth before passing under the comb plate. When the steps collide with the comb plate, it would not only cause equipment damage, but also affect the normal operation of the passenger conveyor system. In severe cases, it may even endanger passengers and cause damage to the items carried.

SUMMARY OF THE INVENTION

In view of the foregoing, the present disclosure provides a passenger conveyor system and an anti-collision device for step and comb plate, so as to solve or at least alleviate one or more of the aforementioned problems and other problems in the prior art, or to provide alternative technical solutions for the prior art.

First, according to one aspect of the present disclosure, a passenger conveyor system is provided, which comprises a step chain having a plurality of steps, a comb plate, and an anti-collision device, wherein the anti-collision device comprises:

- an actuating mechanism connected to the comb plate and configured to, when a moving distance of a step adjacent to comb teeth of the comb plate to be engaged in a vertical upward direction of the passenger conveyor system exceeds a preset value, actuate the comb plate to be lifted up from an initial first position to a second position to avoid collision with the step; and
- a reset mechanism configured to return the comb plate from the second position to the first position after the step travels through the comb plate.

In the passenger conveyor system according to the present disclosure, optionally, the actuating mechanism comprises:

- one or more connecting members fixedly connected to the comb plate and a pressure rail arranged above a guide wheel of the step; and
- one or more pivot members connected to the comb plate such that the comb plate is capable of pivoting upward to lift up the comb teeth of the comb plate by a distance in the vertical upward direction.

In the passenger conveyor system according to the present disclosure, optionally, two ends of the connecting member are connected to a lower surface of the comb plate and an upper surface of the pressure rail, respectively, and at least one of the connecting members is arranged adjacent to the comb teeth.

In the passenger conveyor system according to the present disclosure, optionally, the comb teeth are arranged at a first end on the comb plate and the pivot member is arranged at a second end opposite to the first end on the comb plate, the pivot member including a hinge.

In the passenger conveyor system according to the present disclosure, optionally, the pressure rail is a first pressure rail for a main guide wheel of the step and/or a second pressure rail for an auxiliary guide wheel of the step.

In the passenger conveyor system according to the present disclosure, optionally, the reset mechanism comprises one or more reset assemblies, wherein each reset assembly comprises:

- a bracket fixedly connected to a truss in the passenger conveyor system;
- a rod with two ends thereof connected to the bracket and the pressure rail arranged above the guide wheel of the step, respectively; and
- a spring sleeved on the rod, with two ends thereof being pressed against the bracket and the pressure rail, respectively, wherein when the spring is in an initial state after installation the comb plate is in the first position, and the spring is in a compressed state when the comb plate is in the second position.

In the passenger conveyor system according to the present disclosure, optionally, the reset mechanism comprises two reset assemblies arranged at intervals along a length direction of the pressure rail, and respective rods of the two reset assemblies and the connecting members are linearly arranged along the length direction of the pressure rail.

In the passenger conveyor system according to the present disclosure, optionally, the bracket is configured with a first arm connected to the truss and a second arm connected to the first arm and arranged above the pressure rail, and the rod is connected to the second arm and one end of the spring is pressed against the second arm.

In the passenger conveyor system according to the present disclosure, optionally, the anti-collision device further comprises a triggering member configured to be triggered to generate a first operating signal to be sent to a controller in the passenger conveyor system when the comb plate is lifted up from the first position to the second position, and the controller performs a control operation on the passenger conveyor system based on the first operating signal.

In the passenger conveyor system according to the present disclosure, optionally, the triggering member is further configured to be triggered to generate a second operating signal to be sent to the controller when the comb plate returns to the first position from the second position, and the controller performs a control operation on the passenger conveyor system based on the second operating signal.

In the passenger conveyor system according to the present disclosure, optionally, the triggering member includes a switch component, and the controller controls the passenger conveyor system to stop operating based on the first operating signal.

In the passenger conveyor system according to the present disclosure, optionally, the reset mechanism comprises one or more reset assemblies, wherein each reset assembly comprises:

a bracket fixedly connected to a truss in the passenger conveyor system;

a rod with two ends thereof connected to the bracket and the pressure rail arranged above the guide wheel of the step, respectively; and a spring sleeved on the rod, with two ends thereof being pressed against the bracket and the pressure rail, respectively, and when the spring is in the initial state after installation the comb plate is in the first position, and the spring is in a compressed state when the comb plate is in the second position, wherein the triggering member is connected to the bracket and arranged above the pressure rail.

In the passenger conveyor system according to the present disclosure, optionally, the anti-collision devices are arranged on left and right sides of the step.

In addition, according to another aspect of the present disclosure, an anti-collision device for step and comb plate is further provided, which comprises:

an actuating mechanism connected to a comb plate in a passenger conveyor system and configured to, when a moving distance of a step adjacent to comb teeth of the comb plate to be engaged in a vertical upward direction of the passenger conveyor system exceeds a preset value, actuate the comb plate to be lifted up from an initial first position to a second position to avoid collision with the step; and a reset mechanism configured to return the comb plate from the second position to the first position after the step travels through the comb plate.

The anti-collision device of a passenger conveyor system can effectively prevent the step from colliding with and damaging the comb plate during travel. When encountering abnormal situations, it can also ensure that the step can pass through the comb plate by engaging normally with the comb teeth of the comb plate, and restore the comb plate to its original position after passing through the comb plate. In addition, the anti-collision device provides further safety guarantee, which can quickly detect and notify the system in case of abnormal operation of the steps, so as to perform control operations such as stopping in a timely manner. The anti-collision device is easy to manufacture, install and use and has significant practicality, which can effectively improve system safety.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION OF THE INVENTION

Figure 1:
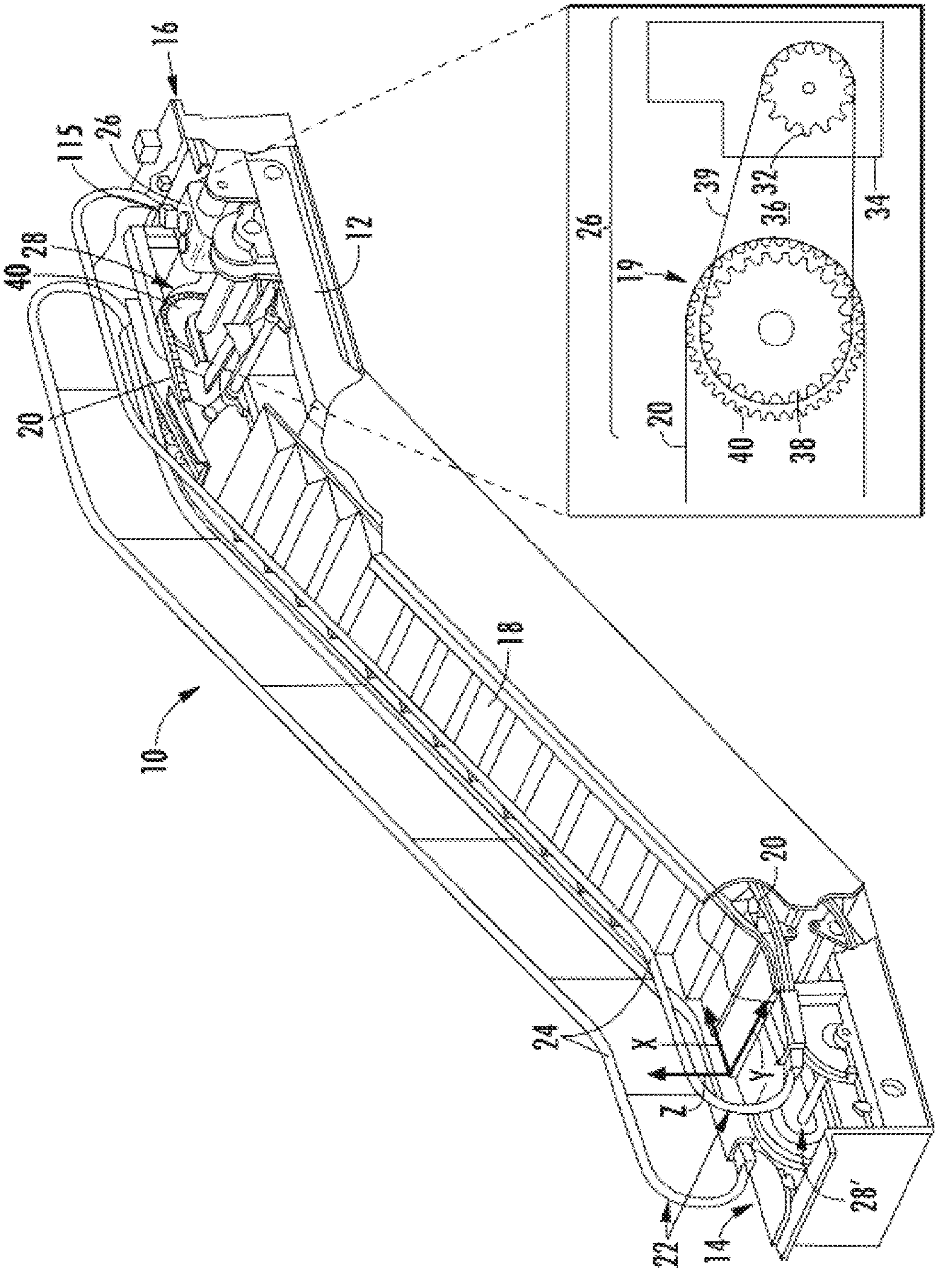
FIG. 1 is a three-dimensional structural schematic diagram of an example of an escalator according to the present disclosure.

FIG. 1 illustrates an escalator 10. It should become apparent in the ensuing description that the invention is applicable to other passenger conveyor systems, such as moving walks. The escalator 10 generally includes a truss 12 extending between a lower landing 14 and an upper landing 16, wherein the truss 12 is fixedly installed on site. A plurality of sequentially connected steps 18 are connected to a step chain 20 and travel through a closed loop path within the truss 12 along guide rails 23 and 23' fixedly connected onto the truss, thus forming a conveying section for carrying passengers. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the steps 18 and/or handrails 24 through the step chain 20. The drive machine 26 operates to move the steps 18 in a chosen direction at a desired speed under normal operating conditions.

The steps 18 make a 180 degree heading change in a turn-around area 19 located under the lower landing 14 and upper landing 16. The steps 18 are pivotally attached to the step chain 20 and follow a closed loop path of the step chain 20, running from one landing to the other, and back again.

The drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member 38, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments the second drive member 38 may be an idle gear or similar device that is driven by the operative connection between the first drive member 32 and the second drive member 38 by means of tension member 39. The tension member 39 travels around a loop set by the first drive member 32 and the second drive member 38, which hereinafter may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

The escalator 10 also includes a controller 115 that is in electronic communication with the drive motor 34. The controller 115 may be located, as shown, in the machine space 28 of the escalator 10 and is configured to control the operation of the escalator 10. For example, the controller 115 may provide drive signals to the drive motor 34 to control the acceleration, deceleration, stopping, etc. of the step 18 through the step chain 20. The controller 115 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Although described herein as a particular escalator drive system and particular components, this is merely exemplary, and those of skill in the art will appreciate that other escalator system configurations may operate with the invention disclosed herein.

An anti-collision device can be configured in the escalator 10. For example, it can be arranged on the left and right sides of the steps 18 or at any suitable position in the system, so that in the event of an abnormal situation such as that shown in the example in FIG. 3, the collision accidents between the step 18 and the comb plate 17 can still be avoided by using the anti-collision device. It should be appreciated that for the purpose of description herein, the technical terms “up”, “down”, “right”, “left”, “front”, “back”, “vertical” and the derivatives thereof should be associated with the present disclosure as oriented in FIG. 1. However, the present disclosure may adopt multiple alternative orientations unless explicitly stated to the contrary.

As used herein, in various embodiments, the anti-collision device may include an actuating mechanism 51 and a reset mechanism 52. When the moving distance of a step 18 in the vertical upward direction (i.e., the Z-axis direction shown in FIG. 1) exceeds a preset value (i.e., exceeds the upper limit of the moving distance as allowed by the design, which will cause the step to be unable to engage normally with the comb teeth, wherein the preset value may vary depending on different application scenarios), the comb plate 17 can be lifted up through the actuating mechanism 51 to change its current position, thereby avoiding collision between it and the step. Then, after the step 18 smoothly passes through the comb plate 17 that has been lifted up, the reset mechanism 52 can be used to return the comb plate 17 to its initial position, that is, to restore the comb plate 17 to its original normal operating state.

Figure 4:
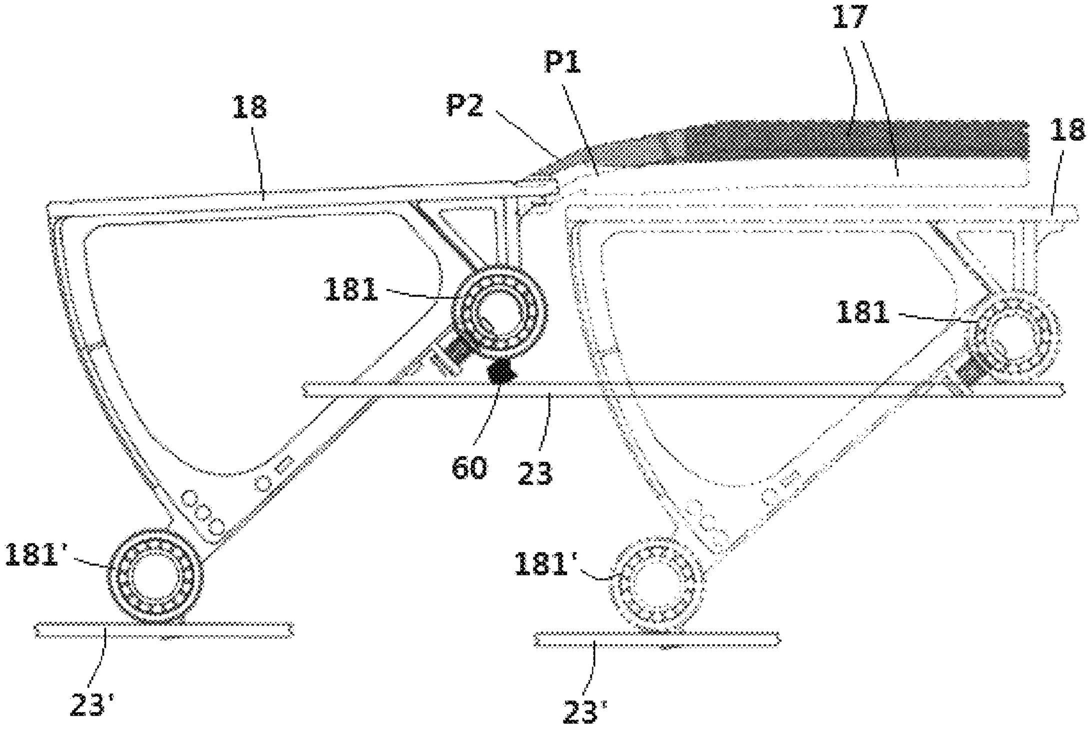
FIG. 4 is a local side-view structural schematic diagram of a step that can still engage normally with the comb teeth on the comb plate in the event of an abnormal situation when an embodiment of the anti-collision device is configured.
Figure 5:
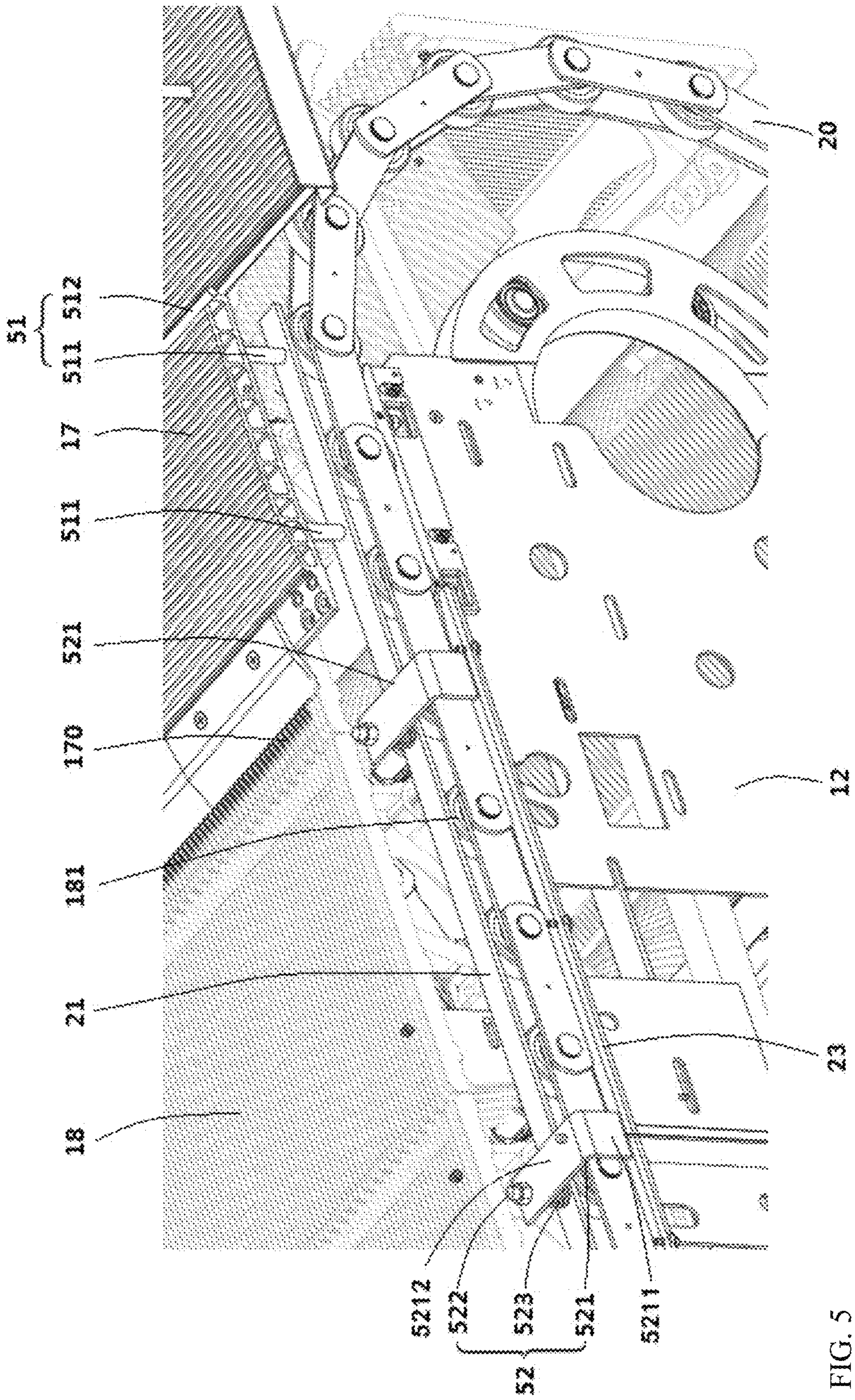
FIG. 5 is a local three-dimensional structural schematic diagram of an embodiment of the anti-collision device according to the present disclosure being configured in the example of FIG. 1.
Figure 6:
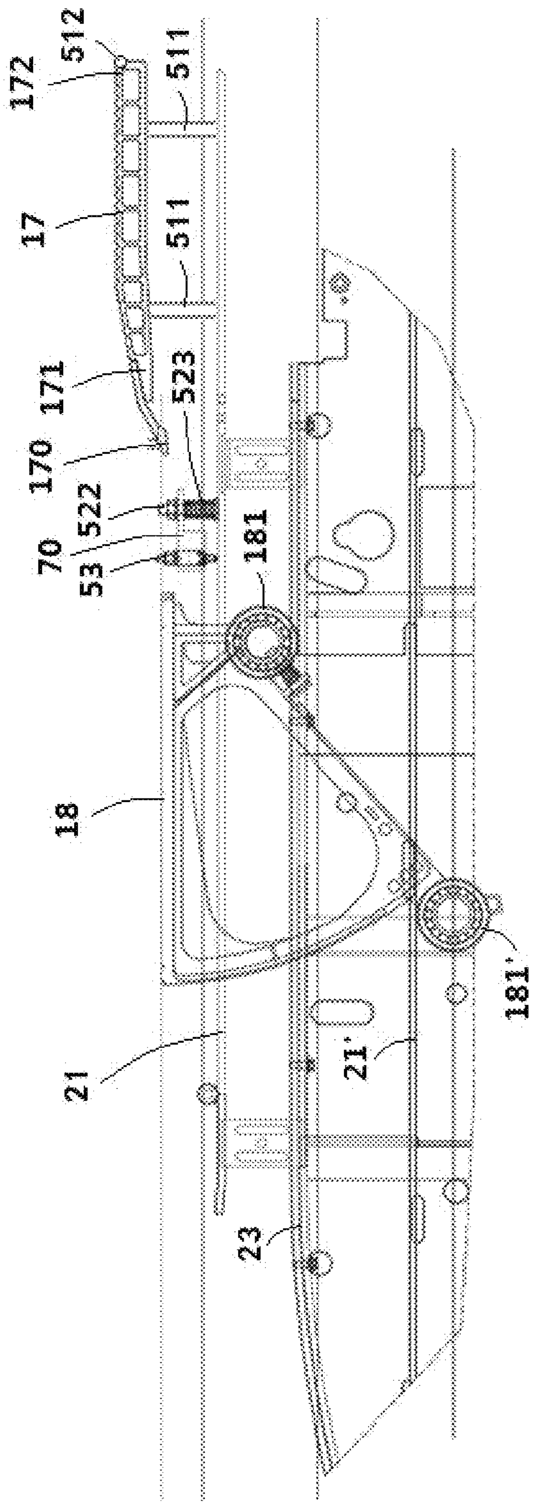
FIG. 6 is a local side-view structural schematic diagram of another embodiment of the anti-collision device according to the present disclosure being configured in the example of FIG. 1.

As an example, referring to FIGS. 4 to 6, the actuating mechanism 51 may include a connecting member 511 and a pivot member 512. Wherein, the connecting member 511 can be fixedly connected to the comb plate 17 and a pressure rail 21 for use in a guide wheel 181 (also commonly referred to as the main guide wheel) of the step 18, and the pivot member 512 can be connected to the comb plate 17, so that the latter can pivot upward. In this way, when a guide wheel 181 of the step 18 is interfered by a foreign object 60, which leads to abnormal lifting up of the step 18, the guide wheel 181 will touch the pressure rail 21 arranged above it and push it upward. At this point, the comb plate 17 that is rigidly connected to the pressure rail 21 through the connecting member 511 of the actuating mechanism 51 will be actuated to be lifted up synchronously, and the pivot member 512 of the actuating mechanism 51 will at this point allow the comb plate 17 and its comb teeth 170 to be lifted up vertically upward, thus allowing the step 18 to travel smoothly through the comb plate 17 and its comb teeth 170 that have been lifted up, so as to avoid collisions between them. It should be noted that the relevant description of the guide wheel 181 of the step 18 and its pressure rail 21 is also applicable to another guide wheel 181' (also commonly referred to as the auxiliary guide wheel) of the step 18 and its pressure rail 21', which will not be repeated here.

For the connecting member 511, it can be optionally constructed into a rod shape or other suitable shape, and the two ends of the connecting member 511 can be connected to the lower surface of the comb plate 17 and the upper surface of the pressure rail 21 using any feasible method such as welding connection, bolt connection, and the like. In addition, one or more connecting members 511 can be configured in the actuating mechanism 51 according to application needs. As used herein, in various embodiments, one or more connecting members 511 can be arranged adjacent to the comb teeth 170 of the comb plate 17, so as to better facilitate the upward lifting up of the comb plate 17 through the force acting on the connecting member 511.

Figure 2:
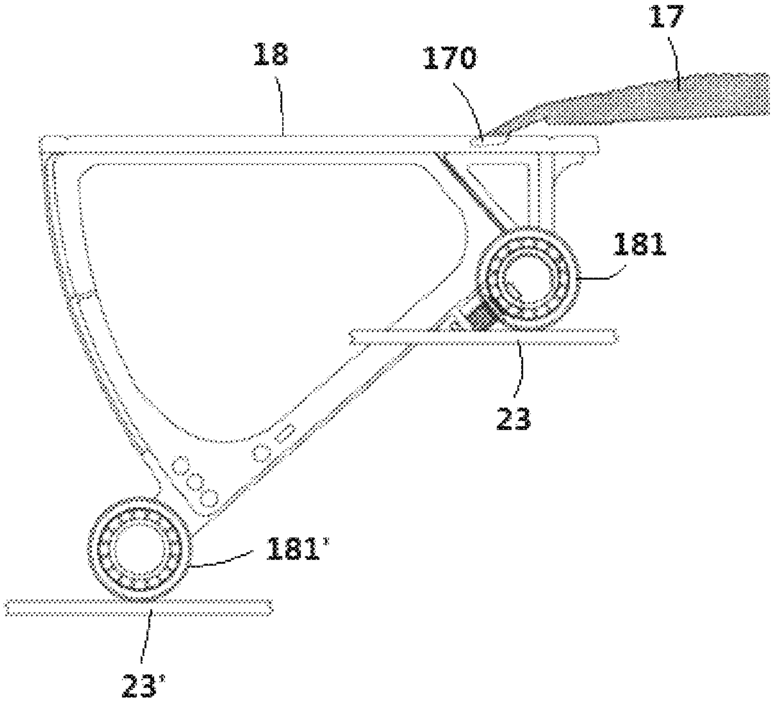
FIG. 2 is a local side-view structural schematic diagram of a step in the example of FIG. 1 engaging normally with the comb teeth on the comb plate.

For the pivot member 512, it can adopt components such as hinges. The comb teeth 170 and the pivot member 512 can be arranged at opposite ends of the comb plate 17, namely a first end 171 and a second end 172 marked in FIG. 6. According to the application needs, one or more pivot members 512 can be configured in the actuating mechanism 51. The comb plate 17 can be directly or indirectly pivoted to the truss 12 through the pivot member 512, so that it can pivot around the pivot provided by the pivot member 512 after being subjected to external forces, especially allowing the first end 171 of the comb teeth 170 to be lifted up from the initial position. In this way, even in the event of abnormal situations, by means of the connecting member 511 and the pivot member 512, it is possible to achieve normal engagement of the step 18 with the comb teeth 170 of the comb plate 17 as shown in FIG. 2, thus safely passing through the comb plate 17 without any collision accidents.

Figure 3:
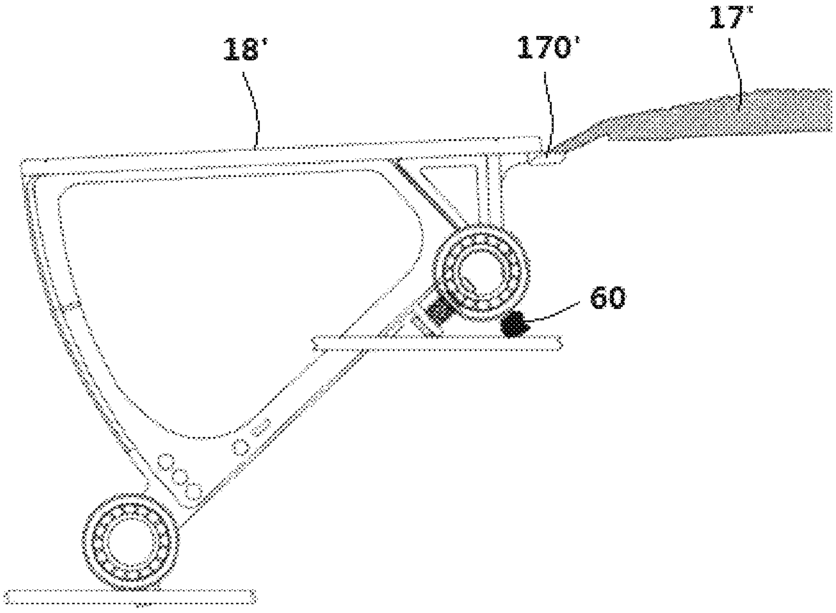
FIG. 3 is a local side-view structural schematic diagram of a step that, in contrast to the normal engaging situation shown in FIG. 2, cannot engage normally with the comb teeth on the comb plate in the event of an abnormal situation in the absence of the anti-collision device according to the present disclosure.

For the sake of clearer understanding, an abnormal situation is illustrated in FIG. 3 in a comparative manner, wherein the anti-collision device according to the present disclosure is not configured in the system at this point. Due to an unexpected foreign object 60 (such as keys, makeup pens, electronic accessories, etc. accidentally dropped by passengers while riding) falling and clamped in the step guide rail, it affects the normal operation of the steps. That is, the guide wheel of the step 18' will be forced to be lifted up and run when it comes into contact with the foreign object 60, which makes it unable to move along the original normal trajectory wherein the step is engaged with the comb teeth 170' on the comb plate 17'. As a result, a collision between the step 18' and the comb teeth 170' will occur, as shown in FIG. 3. Such a scenario that would affect the safe operation of the equipment and endangers personal safety is not expected. Application of the device of the present disclosure can successfully solve such problems.

Referring to FIG. 4, in contrast to the situation shown in FIG. 3, when the anti-collision device of the present disclosure is configured in the passenger conveyor system, even in the event of the abnormal step operation as mentioned above, the comb plate 17 will be synchronously lifted up by the actuating mechanism of the anti-collision device. For example, it is schematically shown in FIG. 4 that the comb plate 17 can be lifted up from an initial position PI to a new position P2, which is relatively higher in the vertical upward direction than the former. As a result, the step 18 can smoothly pass through the comb plate 17 without colliding with it, which makes it possible to advantageously improve the safety performance of the system, especially to reliably ensure the personal safety of passengers.

In the anti-collision device, the reset mechanism 52 is used to facilitate the comb plate 17 that has been lifted up to return to its initial position, so as to restore the system to its normal state. As used herein, in various embodiments, the reset mechanism 52 can be configured with one or more reset assemblies, such as two, three, or more reset assemblies according to application needs, and these reset assemblies can be installed and arranged in any suitable position within the system as needed.

As an example, each reset assembly can include a bracket 521, a rod 522, and a spring 523. Specifically, the bracket 521 can be directly or indirectly fixed to the truss 12 (for example, the bracket 521 can be installed on components such as the guide rail 23), and the two ends of the rod 522 can be fixed to the bracket 521 and the pressure rail 21, respectively, wherein the above connections can be achieved by any feasible connection schemes such as welding or bolt connection. Optionally, the bracket 521 can be constructed into an L-shape, for example, it can have a first arm 5211 and a second arm 5212. The bracket can be fixedly connected to the truss 12 through the first arm 5211, and the second arm 5212 thereof can be connected to the rod 522 using nuts, etc., wherein the second arm 5212 is arranged above the pressure rail 21. The spring 523 can be sleeved on the rod 522, with the upper and lower ends of the spring 523 being pressed against the bracket 521 and the pressure rail 21, respectively. For example, one end of the spring 523 can be pressed against the second arm of the bracket 521. It can be appreciated that when the spring 523 is in its initial state after installation, the comb plate 17 is at this point in the initial position PI as shown in FIG. 4. When the comb plate 17 is forced to be lifted up to a relatively higher position P2, the spring 523 will be at this point in a compressed state under force. Then, when the step 18 smoothly passes through the comb plate 17 and its comb teeth 170 that have been lifted up to avoid collision, the spring 523 in the compressed state will release the stored potential energy, thus pushing the pressure rail 21 and then forcing the comb plate 17 to move downward through the connecting member 511, so that the comb plate 17 is forced to return to its initial position P1, i.e., to restore it to its normal position.

As used herein, in various embodiments, when two or more reset assemblies are configured as shown in FIG. 5, they can be arranged at intervals along the length direction of the pressure rail 21 to ensure a more uniform distribution of force and reliable operation. Optionally, it can be seen that the respective rods 522 and connecting members 511 among these reset assemblies are arranged in a straight line to optimize the layout along the length direction of the pressure rail 21, so as to make the pressure rail, comb plate, steps and other parts more evenly stressed and more durable.

With continued reference to the embodiment shown in FIG. 6, a triggering member 53 can be configured for the anti-collision device as an optional component. By arranging the triggering member 53, it is possible to better grasp the current operating status of the escalator 10 and perform control operations, which is conducive to further improving the safety performance of the system.

Specifically, when an abnormal situation occurs during the operation of the step 18, the actuating mechanism 51 in the anti-collision device will operate and lift up the comb plate 17 from its current position, for example, from the initial position P1 to the new position P2, as shown in FIG. 4. At this point, the triggering member 53 will be triggered to generate an operating signal, which is to be sent to, for example, the controller 115 as mentioned earlier. The controller 115 can perform corresponding control operations on the escalator 10 based on the above operating signal, such as to control the immediate stop of the operation of the escalator 10 to ensure the safety of equipment and personnel in a timely manner. Of course, it can only issue safety warnings to workers and/or passengers without the need to immediately stop the operation. Unlike the prior art, the escalator 10 is already configured with an anti-collision device according to the present disclosure, so it can effectively prevent collisions between the steps and the comb plate.

Further, it can also be optionally configured that when the step 18 smoothly passes through the comb plate 17 that has been lifted up, and then the comb plate 17 returns from the position P2 to the initial position P1, the triggering member 53 can be triggered to generate another operating signal, which is to be sent to the controller 115. The latter can grasp the current operating status of the escalator 10 based on the operating signal, and then perform any possible control operations accordingly, such as releasing previously sent safety warnings, restoring normal operation of the escalator, and the like. These operations can be flexibly configured and adjusted according to specific application needs.

As used herein, in various embodiments, the triggering member 53 can be implemented using any suitable component, such as switch components, sensors, and the like. For example, as shown in FIG. 6, the triggering member 53 can be arranged in association with the bracket 521 in the reset mechanism 52. The triggering member 53 can be installed and connected to the bracket 521 through components such as a connecting bracket 70, wherein the bracket 521 supports the triggering member 53 to be placed above the pressure rail 21 so that when the pressure rail 21 and the comb plate 17 that moves in association with it change their positions, the triggering member 53 will be triggered to operate accordingly (for example, when the triggering member is in the form of a switch component, it will form contact with the pressure rail 21 that has been lifted up and be triggered to generate a corresponding signal, and it will then be triggered again after separation from the pressure rail 21 to generate another corresponding signal). Then, the corresponding signals generated by the triggering member will be provided to the controller 115 of the escalator 10 for related control operations, thereby effectively improving the safety performance of the system.

A passenger conveyor system and an anti-collision device for step and comb plate according to the present disclosure have been described above in detail by way of examples only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed is:

1. A passenger conveyor system, comprising a step chain having a plurality of steps, a comb plate, and an anti-collision device, wherein the anti-collision device comprises:

an actuating mechanism connected to the comb plate and configured to, when a moving distance of a step adjacent to comb teeth of the comb plate to be engaged in a vertical upward direction of the passenger conveyor system exceeds a preset value, actuate the comb plate to be lifted up from an initial first position to a second position to avoid collision with the step; and a reset mechanism configured to return the comb plate from the second position to the first position after the step travels through the comb plate.

2. The passenger conveyor system according to claim 1, wherein the actuating mechanism comprises:

one or more connecting members fixedly connected to the comb plate and a pressure rail arranged above a guide wheel of the step; and one or more pivot members connected to the comb plate such that the comb plate is capable of pivoting upward to lift up the comb teeth of the comb plate by a distance in the vertical upward direction.

3. The passenger conveyor system according to claim 2, wherein two ends of the connecting member are connected to a lower surface of the comb plate and an upper surface of the pressure rail, respectively, and at least one of the connecting members is arranged adjacent to the comb teeth.

4. The passenger conveyor system according to claim 2, wherein the comb teeth are arranged at a first end on the comb plate and the pivot member is arranged at a second end opposite to the first end on the comb plate, the pivot member including a hinge.

5. The passenger conveyor system according to claim 2, wherein the pressure rail is a first pressure rail for a main guide wheel of the step and/or a second pressure rail for an auxiliary guide wheel of the step.

6. The passenger conveyor system according to claim 1, wherein the reset mechanism comprises one or more reset assemblies, each reset assembly comprising:

a bracket fixedly connected to a truss in the passenger conveyor system;

a rod with two ends thereof connected to the bracket and the pressure rail arranged above the guide wheel of the step, respectively; and a spring sleeved on the rod, with two ends thereof being pressed against the bracket and the pressure rail, respectively, wherein when the spring is in an initial state after installation the comb plate is in the first position, and the spring is in a compressed state when the comb plate is in the second position.

7. The passenger conveyor system according to claim 6, wherein the reset mechanism comprises two reset assemblies arranged at intervals along a length direction of the pressure rail, and respective rods of the two reset assemblies and the connecting members are linearly arranged along the length direction of the pressure rail.

8. The passenger conveyor system according to claim 6, wherein the bracket is configured with a first arm connected to the truss and a second arm connected to the first arm and arranged above the pressure rail, and the rod is connected to the second arm and one end of the spring is pressed against the second arm.

9. The passenger conveyor system according to claim 1, wherein the anti-collision device further comprises a triggering member configured to be triggered to generate a first operating signal to be sent to a controller in the passenger conveyor system when the comb plate is lifted up from the first position to the second position, and the controller performs a control operation on the passenger conveyor system based on the first operating signal.

10. The passenger conveyor system according to claim 9, wherein the triggering member is further configured to be triggered to generate a second operating signal to be sent to the controller when the comb plate returns to the first position from the second position, and the controller performs a control operation on the passenger conveyor system based on the second operating signal.

11. The passenger conveyor system according to claim 9, wherein the triggering member includes a switch component, and the controller controls the passenger conveyor system to stop operating based on the first operating signal.

12. The passenger conveyor system according to claim 9, wherein the reset mechanism comprises one or more reset assemblies, each reset assembly comprising:

a bracket fixedly connected to a truss in the passenger conveyor system;

a rod with two ends thereof connected to the bracket and the pressure rail arranged above the guide wheel of the step, respectively; and a spring sleeved on the rod, with two ends thereof being pressed against the bracket and the pressure rail, respectively, and when the spring is in the initial state after installation the comb plate is in the first position, and the spring is in a compressed state when the comb plate is in the second position, wherein the triggering member is connected to the bracket and arranged above the pressure rail.

13. The passenger conveyor system according to claim 1, wherein the anti-collision devices are arranged on left and right sides of the step.

14. An anti-collision device for step and comb plate, comprising:

an actuating mechanism connected to a comb plate in a passenger conveyor system and configured to, when a moving distance of a step adjacent to comb teeth of the comb plate to be engaged in a vertical upward direction of the passenger conveyor system exceeds a preset value, actuate the comb plate to be lifted up from an initial first position to a second position to avoid collision with the step; and a reset mechanism configured to return the comb plate from the second position to the first position after the step travels through the comb plate.

* * * * *